US005895443A

United States Patent [19]

Gross, Jr. et al.

[11] Patent Number: 5,895,443

[45] Date of Patent: *Apr. 20, 1999

[54] TESTABLE NON-VOLATILE MEMORY DEVICE

[75] Inventors: William Gross, Jr., Chandler; Gregory D. Sabin, Phoenix, both of Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/690,228

[22] Filed: Jul. 19, 1996

Related U.S. Application Data

[62] Division of application No. 08/595,796, Feb. 2, 1996, Pat. No. 5,603,412, which is a division of application No. 08/312,831, Sep. 27, 1994, Pat. No. 5,538,141.

[51] Int. Cl.[6] .................................................. G05B 19/02

[52] U.S. Cl. ............... 702/120; 364/478.01; 364/478.03; 209/571; 209/573

[58] Field of Search ......................... 364/478.01, 478.02, 364/478.03, 580, 579; 209/571, 573, 574, 3.3; 324/537, 555, 759, 764, 766; 29/543, 705; 702/120; 371/22.6; 395/183.06

[56] References Cited

U.S. PATENT DOCUMENTS

| | | | |
|---|---|---|---|
| 3,995,215 | 11/1976 | Chu et al. | 324/158 R |
| 4,459,685 | 7/1984 | Sud et al. | 365/200 |
| 4,797,808 | 1/1989 | Bellay et al. | 364/200 |
| 4,871,963 | 10/1989 | Cozzi | 324/73 R |
| 4,888,715 | 12/1989 | Tada et al. | 364/550 |
| 4,926,363 | 5/1990 | Nix | 364/579 |
| 4,967,387 | 10/1990 | Shibasaki et al. | 364/580 |
| 5,084,843 | 1/1992 | Mitsuishi et al. | 365/218 |
| 5,132,928 | 7/1992 | Hayashikoshi et al. | 365/63 |
| 5,341,382 | 8/1994 | Levitt | 371/22.1 |
| 5,369,647 | 11/1994 | Kreifels et al. | 371/25.1 |
| 5,436,913 | 7/1995 | Yamamura et al. | 371/12.2 |
| 5,566,194 | 10/1996 | Wells et al. | 371/51.1 |
| 5,568,426 | 10/1996 | Roohparvar | 365/201 |
| 5,625,591 | 4/1997 | Kato et al. | 365/185.24 |
| 5,625,838 | 4/1997 | Caudel et al. | 395/800 |

*Primary Examiner*—Reba I. Elmore
*Assistant Examiner*—Ramesh Patel
*Attorney, Agent, or Firm*—Blakely, Sokoloff, Taylor & Zafman LLP

[57] ABSTRACT

The present invention provides test flow assurance using memory imprinting. The device being tested includes a nonvolatile memory portion for storing an information imprint in a present test status field. The imprint indicates the bin category to which the device is to be directed according to the results of a test sequence. During the start of a test in the test flow, the present test status field is read to determine whether the device has already passed through the present test. If so, the device is not retested according to that test step, and it is binned out according to the imprinted information. If the imprint indicates that the device has not already passed through the present test, then the present test sequence is performed, the device programmed with its imprint, and binned out accordingly. If, during the present test sequence, the imprint indicates that the device did not pass through a previous test sequence as it should have, then the device is binned out as a failure because it was not properly processed. Alternatively, the device may be binned out as requiring testing according to the prior tests that the part has not undergone.

7 Claims, 6 Drawing Sheets

TESTABLE NON-VOLATILE MEMORY DEVICE

This is a divisional of application Ser. No. 08/595,796, filed Feb. 2, 1996 now U.S. Pat. No. 5,603,412, which is a divisional of application Ser. No. 08/312,831, filed Sep. 27, 1994 now U.S. Pat. No. 5,538,141.

BACKGROUND OF THE INVENTION

1. Field of the Invention

The present invention relates to the field of testing electronic components, and more particularly to ensuring that proper testing procedures for memory devices have been performed.

2. Description of the Related Art

Electronic circuits must operate in a variety of environments. Although typical consumer products generally operate in relatively innocuous environments at near room temperature, military equipment often is exposed to environmental extremes. For example, military radar, computers and communications equipment must be able to withstand the heat of desert combat, as well as the coldest terrestrial environments.

To ensure the reliability of its electronic equipment, the United States military requires compliance of the equipment and its components parts with so-called "Mil Specs." One such specification or standard is Mil-Std-883 group A, which governs the testing of electronic components, such as memory devices. This standard generally requires that components (also referred to as "units" or "parts") having memory storage capabilities be tested for power requirements, memory access time and other features at a number of different temperatures. The test equipment typically used to test electronic components is illustrated in FIG. 1A. The equipment includes a tester 100 having a test head 102, which communicates with the tester 100 over a cable 110. The test head 102 includes a loadboard 104. The part to be tested 106 is butted up against a contactor 105 (shown in FIG. 1B) on the loadboard 104.

FIG. 1B is a detailed illustration of a tester 100, such as the Genesis II model manufactured by Megatest Corporation. The tester 100 typically includes a keyboard 150 to allow the test operator to control the testing, and a display device 152 to display test results, among other data. The keyboard 150 and the monitor 152 are coupled to a test controller 154, which is typically implemented as a microprocessor. The test controller 154 instructs a timing generator 156 to generate various timing signals to be applied to the component 106 through pin electronics 158, loadboard 104 and contactor 105. The pin electronics 158 conforms the timing signals to the parameters of the device 106, e.g., voltage levels, slew rate, etc. Note that the pin electronics may be internal or external to the test head 102.

Under program control of the test controller 154, a parametric measurement unit (PMU) 160 applies voltage or current to the device 106 to measure the resulting current or voltage, respectively. The PMU 160 also measures the timing of the resulting signals, e.g., memory access time. The PMU 160 returns the test results to the test controller 154, which in turn may display the results on the monitor 152.

The part 106 may be pushed against the contactor 105 using a simple hand socket, as is known in the art. Based upon the test results, the test operator manually places the part in a bin container (not shown) corresponding to the test outcome.

Alternatively, the test equipment may employ a handler 180 (see FIG. 1A), such as a MCT Corporation Model 3608. The handler includes loading tubes 108, which store the parts 106 to be tested. The parts 106 are gravity fed from the loading tubes 108 to the contactor 105. Settings on the handler 180 control the temperature at which the parts 106 are tested. After a part 106 has been tested, over the interface cable 112 the tester 100 instructs handler control circuitry (not shown) in the handler 180 to direct the part 106 to an appropriate collection bin tube 114. Typically, one or more bin tubes 114 are devoted to parts that fail, while others are dedicated to collecting parts that exhibit various memory access times. After a predetermined number of parts have been tested, the collection bin tubes 114 are removed from the handler 180, and the tubes are placed in bin containers (not shown) outside of the handler. Each bin container corresponds to an associated collection bin tube category.

To comply with Mil Specs, the test equipment puts the parts through a "test flow" which may roughly be described as follows:

SORT 1
BAKE
SORT 2
ASSEMBLY
RAW CLASS
BURN-IN
PBIC (25° C.)
FPO-1 (128° C.)
QABO (125° C.)
FPO-2 (−58° C.)
QABO (−55° C.)
MARK
PACK
FQA (25° C.)

Each step of the test flow is summarized as follows:

SORT 1

During SORT 1, all of the memory devices remain attached together in the same wafer. All memory cells are programmed to hold a charge.

BAKE

During BAKE, the wafer is heated for 72 hours at a temperature of approximately 250° C.

SORT 2

During SORT 2, all memory cells are tested to make sure that none has lost the programmed charge. If any cells have lost their charge, then the wafer is discarded.

ASSEMBLY

The wafer is diced and connected to the device pins, inside a suitable electronic package.

RAW CLASS

During RAW CLASS, the devices are initially checked for broken bonds by running continuity and leakage checks on all chips.

BURN-IN

Typically, if a part is defective, it will fail during the first year of its life. Thus, during BURN-IN, the inputs of the device are toggled at a high voltage and a high temperature to simulate the effects of approximately one year of usage. If the device survives BURN-IN, then there is a high probability that the device will not fail in the future.

PBIC (25° C.)

During the POST BURN-IN CHECK ("PBIC") of the test flow, all units are run through a "test sequence" at 25° C. (approximately room temperature) by the tester 100. The test sequence, which is repeated in later steps at different temperatures, may roughly be described as follows:

CONTINUITY
LEAKAGE

POWER
PROGRAM
TIMING
ERASE
SPECIAL FUNCTIONS
BINOUT

Each step of the test sequence may be summarized as follows:

1. Continuity

The Continuity check ensures that all pins of the part 106 contact the contactor of the test head 180. The tester 100 forces a voltage onto selected pins of the part 106, and measures the resulting current. If the measured current falls within a given range, then the part 106 passes the continuity test. If, however, the current falls outside the acceptable range, then the part 106 fails the continuity check, and the tester 100 instructs the handler 180 to place the part 106 in a collection bin tube 114 for failed parts (the "failure collection bin tube").

2. Leakage

During the Leakage test step, the parts that passed the continuity check are tested to determine whether any leads are shorted together. Failed parts are directed to the failure collection bin tube, while passing parts remain in contact with the test head 180 for the next test step.

3. Power

The tester 100 causes the supply voltage specified in the parts manual to be applied to the part 106. The resulting current is measured. If the current falls outside of a predetermined range, the part is rejected and directed to the failure collection bin. Otherwise, the part is left in place against the contactor for the next test step.

4. Program

During the Program step, the tester 100 programs the nonvolatile memory device 106 with a predetermined bit pattern, preferably arranged to induce the worst case timing situation.

5. Timing

The tester 100 performs timing tests on each memory cell of the device 106 to determine the worst case memory access time. If the memory access time is unacceptable, then the part is binned out to the failure collection bin tube. Typically, within the acceptable timing range, there may be more than one acceptable memory access time depending upon the needs of the customer. For example, some customers require a 100 nanosecond memory access time, while others are satisfied with a 120 nanosecond memory access time. Accordingly, if the part 106 passes the tests following the timing test, it may be directed to one of a number of bins according to the worst case access time of the part being tested.

6. Erase

During this test step, the part 106 is erased of the programming it received during the Program step.

7. Special Functions

During this step, the tester 100 tests special chip functions. For example, the part may be checked for junction spiking, leaky columns, and other physical device defects, and binned out accordingly as having passed or failed these tests.

8. Binout

During Binout, if the part 106 has not already been binned out because of failure, it is in this step directed to the appropriate collection bin tube 114 depending upon whether the part, for example, exhibited a high, low or medium memory access speed, among other parameters.

FPO-1 (128° C.)

After a part 106 has passed the PBIC (25° C.) test of the test flow, it is put through the first flow process order (FPO-1) test, in which the part is tested according to the above-described test sequence at 128° C. The military test specification requires that the part be operable at 125° C. Therefore, the part is actually tested with a 3° guard band at 128° C.

QABO (125° C.)

During Quality Assurance Buy Off ("QABO") testing only a sample of the entire lot of units 106 is tested at 125° C. Theoretically, any parts that reach this step without failure should pass the QABO test at the non-guardbanded 125° C. temperature. If a part 106 fails this test, then the testing procedure itself is suspect, and the entire lot must be retested.

FPO-2 (−58° C.)

All those parts 106 that pass the QABO test are tested according to the test sequence at −58° C. The testing temperature represents a temperature of −55° C. as specified by the military specification with a 3° C. guard band.

QABO (−55° C.)

Similar to the previous QABO test, this QABO test runs a sample of the units 106 through the test sequence at the non-guardbanded cold temperature. If any parts fail this test, then the entire lot must be retested, as explained above.

MARK and PACK

All parts that pass the previous tests are marked with the appropriate part number and packed in boxes.

FQA (25° C.)

A sample of units are unpacked for testing at room temperature according to the test sequence. If all of the sampled parts 106 pass FQA, then they are repackaged and shipped. By the time a part 106 reaches FQA, it theoretically must have passed all the other tests. If a part fails FQA, the failure may indicate that the testing procedure is faulty, and thus the entire lot must be rescreened through the test flow.

A common cause of disruption in the test flow is misdirection of a part into the wrong bin during Binout. Misdirection may occur due to a mechanical problem in the handler whereby the part falls into the wrong collection bin tube. Further, even though the part may fall into the correct collection bin tube, the tube itself may be manually misplaced into the wrong bin container by the test equipment operator. Thus, when parts are removed from the bin and placed into the loading bin tubes 108 for the next test step of the test flow, a part that has failed the previous test may actually have been erroneously passed on to the next test. This would result in a failure at FQA, requiring expensive rescreening of the entire lot. Alternatively, a part that has not been tested at all may erroneously be passed on to the next test. Finally, a part from one passing category may be treated as belonging to another passing category, and thus miscategorized for the remaining tests in the test flow.

Based on the foregoing, it should be appreciated that it is desirable to guarantee that by the time a part has reached final quality assurance testing, the part has passed through each test of the test flow. By doing so, the need to rescreen the entire lot due to faulty test processing is minimized.

SUMMARY OF THE INVENTION

The present invention provides test flow assurance using memory imprinting. According to the invention, a test flow is implemented as a series of tests, and at least one test of the test flow is implemented as a sequence of steps of a test sequence. The component to be tested includes at least one nonvolatile test status field. The type of test to which the component is subjected to is called the "present test."

During the present test, a component tester reads a present test status field of the component. The present test status field includes at least one nonvolatile memory cell that remains unerased after each test of the test flow. Based upon the present test status field, the tester determines whether the component has already been tested according to the present test. If the component has already been tested according to the present test, the tester instructs a component handler to binout the component according to the present test status field. The handler may be an automated handler or a human test operator. Alternatively, if the component has not already been tested according to the present test, the tester continues with the test sequence of the present test. In the latter case, the tester writes the present test status field with the results of the present test.

In one embodiment, before the tester reads the present test status field, the tester may read prior test status fields associated with prior tests of the test flow. Each prior test status field includes at least one nonvolatile memory cell that remains unerased after each test of the test flow. Based upon the prior test status fields, the tester determines whether the component has been tested according to all of the prior tests. If the component has been tested according to all of the prior tests, then the tester determines whether the component has passed all the prior tests based upon the prior tests status field associated with each prior test. If the component has not passed all of the prior tests, the tester instructs the handler to bin out the component to a collection bin area representing that the component has failed the test flow.

If the component has not been tested according to all of the prior tests, the tester may instruct the handler to bin out the component to the collection bin area representing that the component has failed the test flow. Alternatively, in that case, the tester may instruct the handler to bin out the component to a collection bin area representing that the component requires testing according to the prior tests that the component has not undergone.

A testable memory device of the present invention includes a number of memory cells. Some of the memory cells are imprintable nonvolatile memory cells that remain unerased after each test of the test flow. The testable memory device includes decoder circuitry for accessing the imprintable cells. The imprintable cells are grouped into test status fields. Each test status field represents the result of a corresponding test of the test flow. The test status fields include the present test status field and the prior test status fields.

The test flow of the present invention specifically identifies those individual parts for which the testing procedure has failed, and thus does not require the assumption that all parts have been improperly tested. Consequently, this technique avoids the need to rescreen the entire lot of units.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

The present invention provides a method and apparatus for test flow assurance using memory imprinting. For purposes of explanation, specific details are set forth to provide a thorough understanding of the present invention. However, it will be understood by one skilled in the art, from reading this disclosure, that the invention may be practiced without these details. Moreover, well-known elements, devices, process steps and the like are not set forth in order to avoid obscuring the invention.

Figure 1A:
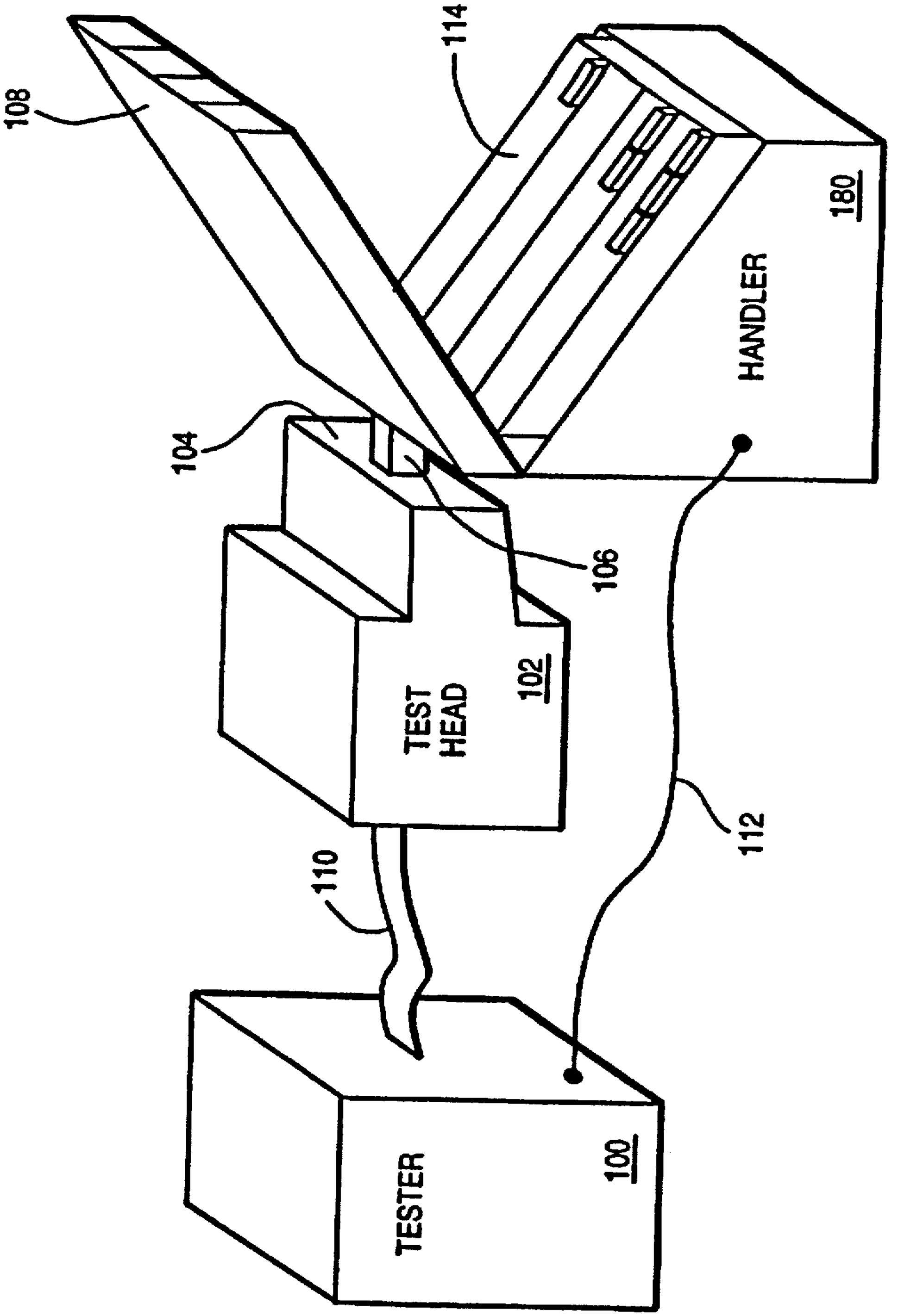
FIG 1A (PRIOR ART)
FIG. 1A illustrates test equipment used to test electronic components.
Figure 1B:
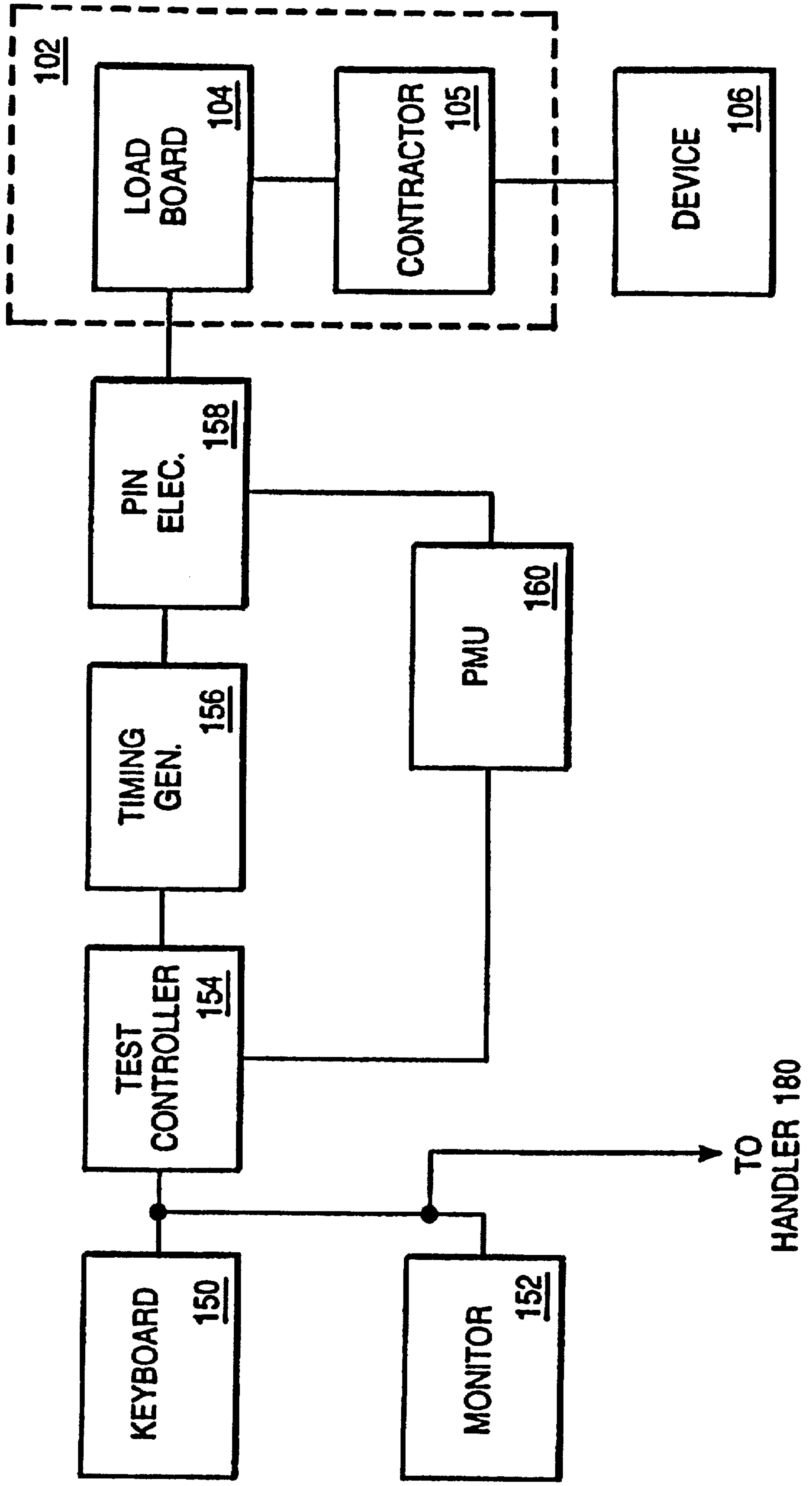
FIG 1B (PRIOR ART)
FIG. 1B is a detailed illustration of a component tester.
Figure 2:
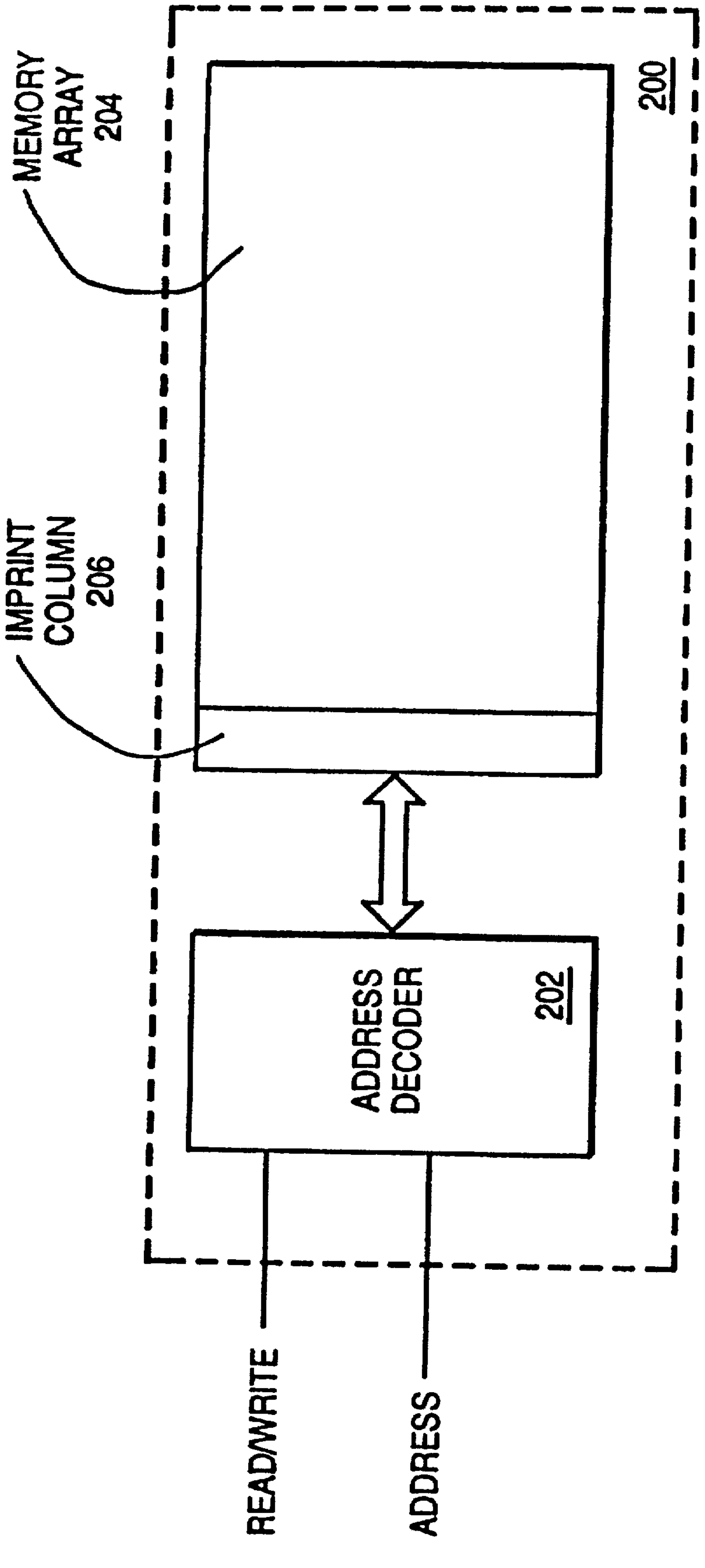
FIG. 2 illustrates an embodiment of a memory device according to the present invention.

FIG. 2 illustrates a preferred embodiment of a memory device 200 according to the present invention. The memory device 200 includes an address decoder 202 and a memory array 204. The memory array 204 preferably includes an imprint column 206 that is implemented as a column of unerasable programmable read only memory (UPROM) cells. In an 8 kilobit memory array 204, the imprint column may be configured as 1K×1 bits. The imprint column 206 consists of unerasable nonvolatile memory cells so that information concerning the status of the chip 200 can be maintained after the device has been binned out between tests of the test flow.

The imprint column is preferably invisible to the user, and accessible only to the manufacturer and the test flow operator. Restricted access may be achieved through the use of special memory access instructions combined with specified hardware requirements. For example, writing a 16 bit word to the imprint column may be implemented using microcode executed by the test controller 154 that writes the bits during sixteen passes of a loop that starts at the appropriate starting row address and runs down the column. The specialized write instruction may be of the form WRITE_IMPRINT (data) and the corresponding read instruction of the form READ_IMPRINT (data). To provide further security, accessing the imprint column may also require that the supply voltage to the memory chip 200 be raised above the normal logic level voltage to a predetermined imprint column access voltage, for example. One skilled in the art will recognize that any means for storing nonvolatile information on the chip 200 may be used, as long as the information is protected from erasure or overwriting during the Erase, Program and other steps of the test sequence. It should be pointed out that the information may not only be stored in column form, but may in fact be placed in any order throughout the memory array 204 as long as the above conditions are satisfied.

Figure 3:
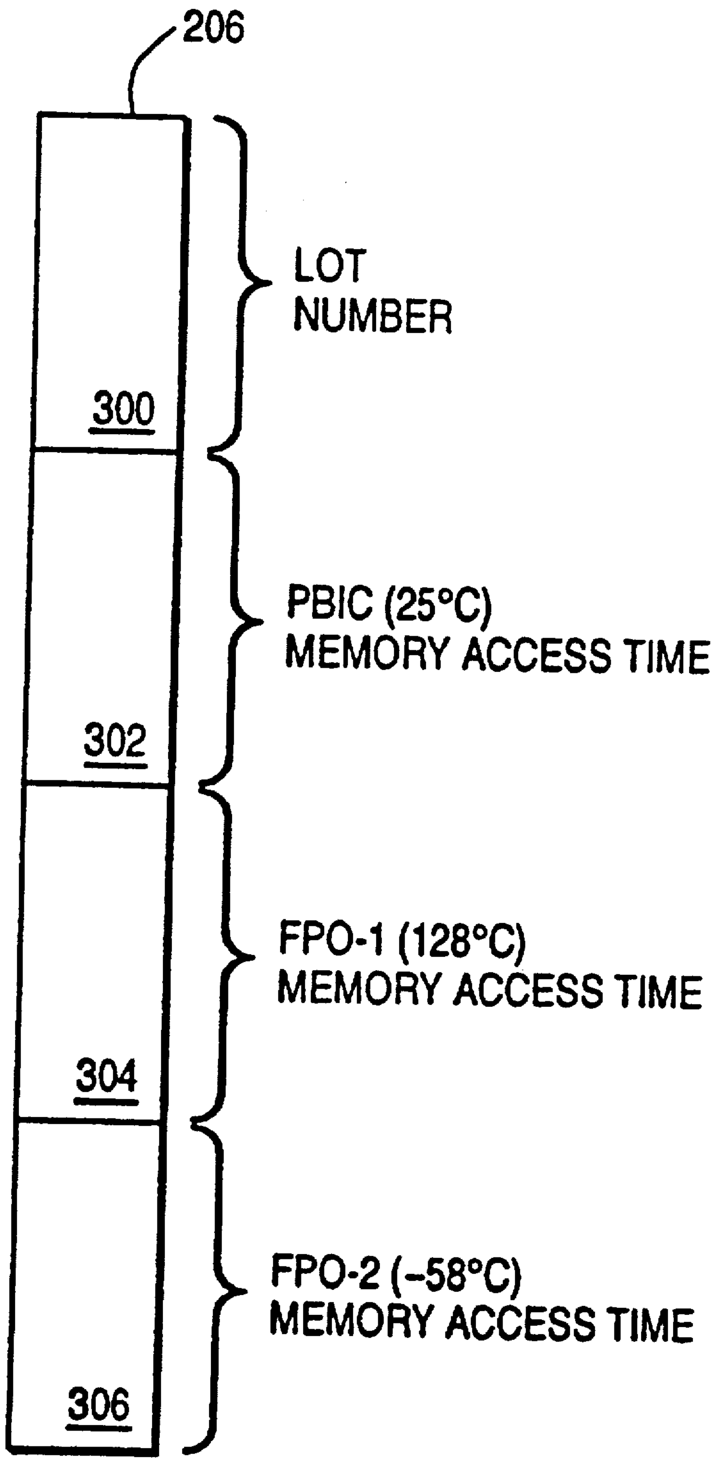
FIG. 3 illustrates an example of an imprint column for storing test status information.

FIG. 3 illustrates an example of an imprint column 206 that can be used to store test status information concerning a device 200 that is being tested according to the military test flow standard described above. A first field 300 may be assigned to hold a column of bits representing the lot number of a part 200 being tested. A second field 302 may represent the worst case memory access time of the device 200 as a result of the PBIC (25° C.) test of the test flow. For example, the field 302 may comprise 3 bits with the bit pattern 001 representing a high speed memory access, e.g., the worst case memory access time is less than or equal to 100 nanoseconds. The bit pattern 010 may represent a low speed memory access, e.g., the worst case memory access time is greater than 100 nanoseconds but less than or equal to 120 nanoseconds. Further, the bit pattern 111 may represent failure, e.g., the worst case memory access time is greater than 120 nanoseconds, thus falling outside of the acceptable range. Similarly, a third field 304 and a fourth field 306 may respectively represent the worst case memory access times for the tests FPO-1 (128° C.) and FPO-2 (−58° C.). One skilled in the art will recognize that the imprint column may store status information regarding any test flow tests in any order, and is not limited to the tests of the military standard test flow.

The operation of the present invention will now be described with reference to the flow charts of FIGS. 4 and 5. All testing is performed under program control of the test equipment of the present invention. One skilled in the art will recognize that the present invention may be implemented by programming a standard microprocessor-based tester, such as the Genesis II model, manufactured by Megatest Corporation, according to the process of FIGS. 4 and 5.

Figure 4:
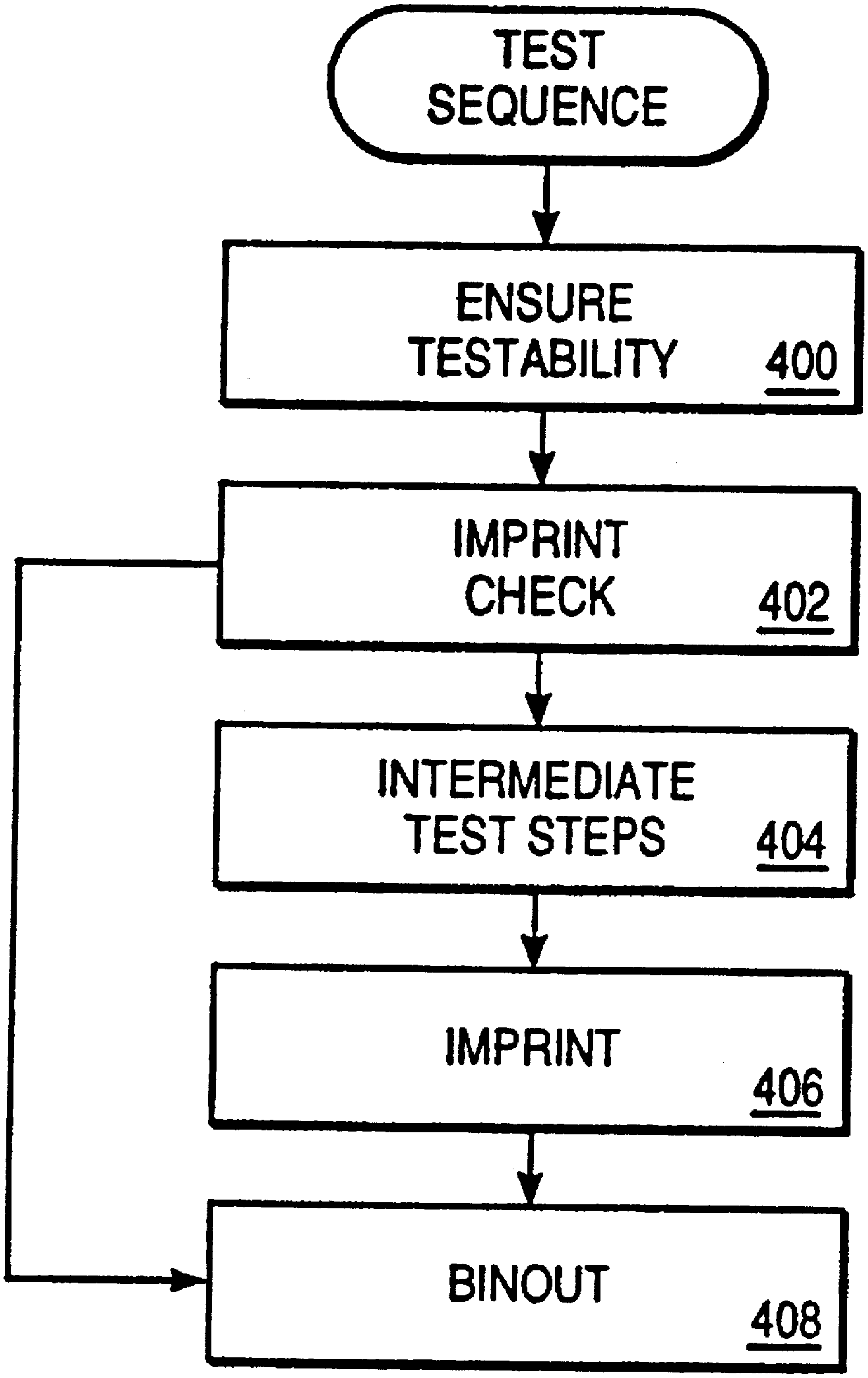
FIG. 4 illustrates the test sequence according to the present invention.
Figure 5:
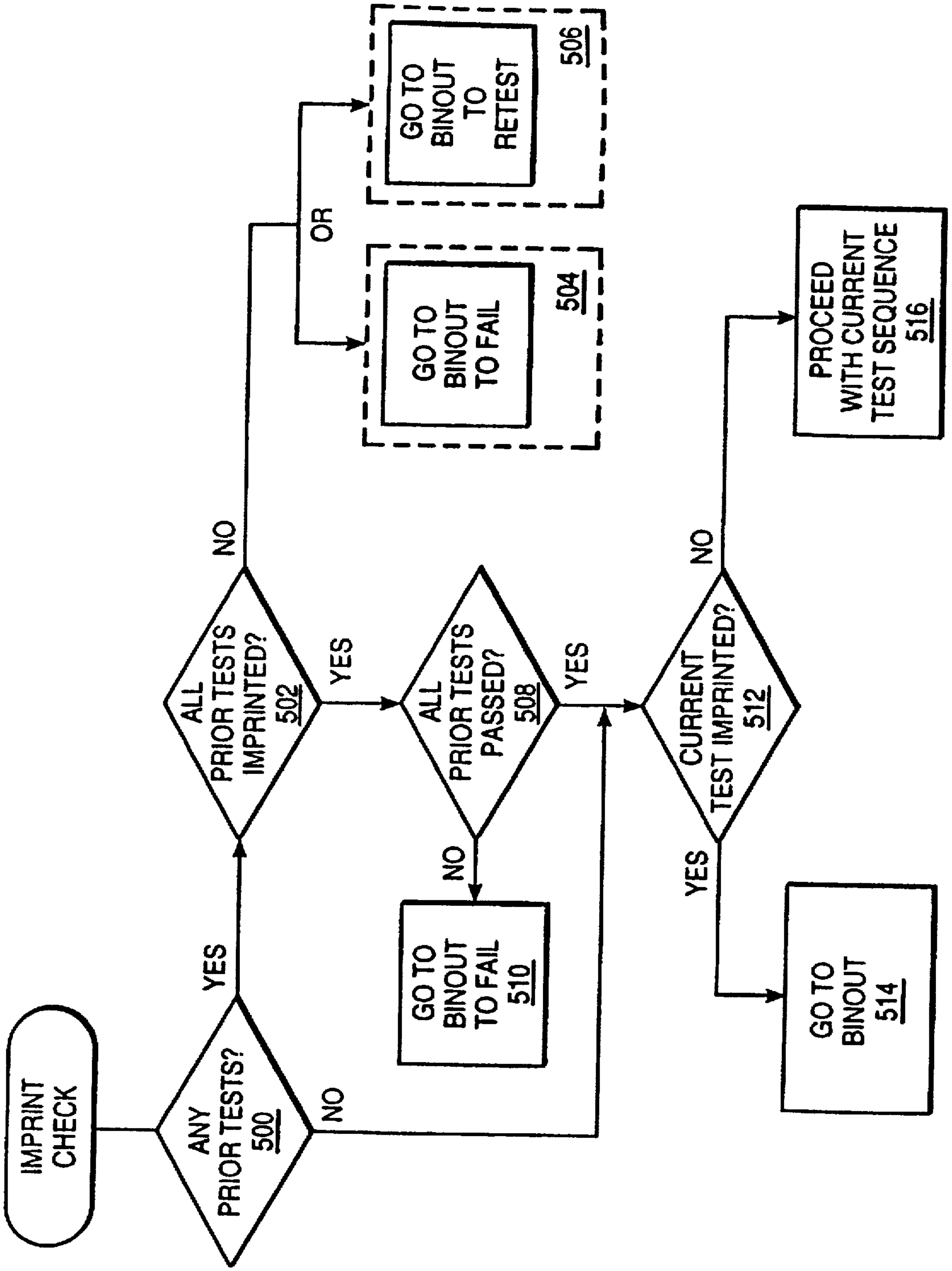
FIG. 5 illustrates imprint checking according to the present invention.

FIG. 4 illustrates the test sequence according to the present invention. First, some preliminary test sequence steps are carried out to ensure testability (step 400). These steps may include, for example, Continuity and Leakage tests. After testability has been ensured, the present invention conducts an imprint check (step 402). During the imprint check, the imprint information is read to determine whether the part has passed all prior test flow tests, if any, and whether it has already been tested under the present test. The reading of the imprint information is preferably performed by the test controller 154 using the READ_IMPRINT instruction. The present invention allows testing to proceed with the normal test sequence only if the part 200 has passed all prior tests and has not already been tested according to the current test. Otherwise, the part 200 is binned out. A more detailed explanation of the imprint check will be provided below with respect to FIG. 5.

Assuming the part 200 is not binned out, the part is put through the normal intermediate test steps (step 404). Examples of the intermediate test steps include the Power, Program, Timing, Erase and Special Function test steps of the standard military test sequence. After passing through the intermediate test steps, the appropriate locations in the imprint column are imprinted with test status information concerning the current test. As discussed above, such information typically indicates whether the memory access time falls into one of a number of speed categories or whether the part has failed (step 406). According to the imprint information, the part 200 is then binned out (step 408).

The imprint check will now be described in detail with respect to FIG. 5. The tester first determines whether any test in the test flow should have been conducted prior to the present test (step 500). This determination is inherently made by the test controller 154 which, of course, knows the test flow pattern that it is following. For example, if the tester is currently performing the test sequence for the FPO-2 test, it is known that the part being tested should have already passed through the PBIC and FPO-1 tests. If prior tests should have been performed, then the tester determines whether all prior tests have been imprinted (step 502). If all prior tests have not been imprinted then, in one embodiment, the tester causes the part to be binned out to a bin representing parts that have failed the test flow (step 504). These parts may be scrapped. Alternatively, the part may be binned out to be retested starting at the beginning of the test flow or according to the tests that were missed (step 506). The latter procedures help ensure that the part will pass through all of the test flow tests.

If the part has been imprinted for all prior tests, then the imprints are examined by the test controller 154 to determine whether the part has passed all prior tests (step 508). This determination is made to screen out those parts that may have failed the prior test flow tests, yet were misdirected into a passing bin. If the part has not passed all prior tests, then it is binned out to a bin dedicated to failed units and scrapped (step 510).

If, however, the part has passed all prior tests or there were no prior tests, e.g., the current test is the first test (PBIC (25° C.)), then the tester determines whether the part has already been imprinted for the present test (step 512). If the part has already been imprinted for the present test, then this indicates that the part has already been tested under the present test. Thus, there is no need to proceed with the present test sequence, and the part can be binned out according to the present test imprint (step 514). If, however, the part is not imprinted with the present test imprint, then the tester allows the part to proceed with the present test sequence (step 516).

It will be appreciated that various modifications and alterations might be made by those skilled in the art without departing from the spirit and scope of the present invention. In particular, one skilled in the art will recognize that the present invention may be applied to provide assurance in the testing of any item, whether electronic, mechanical or otherwise, as long as the item incorporates a nonvolatile memory portion. The invention should, therefore, be measured in terms of the claims which follow.

What is claimed is:

1. A semiconductor component comprising:

a plurality of programmable nonvolatile memory cells that indicate test status of the component and that remain unerased after a test in a test flow, such that all of the results of said test flow remain programmed on said plurality of programmable nonvolatile memory cells without being erased during another test flow;

decoder circuitry for accessing said plurality of nonvolatile memory cells;

wherein said programmable non-volatile memory cells are grouped into test status fields, each test status field for representing a result of a corresponding test of said test flow.

2. The semiconductor component of claim 1, wherein the memory cells are organized into groups, a first group providing a present test status field indicating whether the semiconductor component has been tested according to a present test.

3. The semiconductor component of claim 2, wherein a second group provides a prior test status field that indicates whether the device has completed a prior test.

4. A semiconductor component comprising:

test control circuitry having a test status field including at least one programmable nonvolatile memory cell that remains unerased after a test in a test flow, wherein said at least one programmable nonvolatile memory cell is programmable with the result of a test from said test flow, such that the result of said test from said test flow remains programmed on said programmable nonvolatile memory cell without being erased during another test flow; and decoder circuitry for accessing said test control circuitry and said at least one programmable nonvolatile memory cell.

5. The semiconductor component of claim 4, wherein said test status field indicates the test status of a particular test in said test flow by one of the following:

said programmable nonvolatile memory cell associated with said test remains unprogrammed to indicate that the semiconductor component has not been tested with said particular test;

said programmable nonvolatile memory cell associated with said test is programmed to indicate that the semiconductor component has passed said particular test; and said programmable nonvolatile memory cell associated with said test is programmed to indicate that the semiconductor component has not passed said particular test.

6. The semiconductor component of claim 4, wherein said test circuitry comprises a plurality of test status fields each of said plurality of said test status fields having at least one programmable nonvolatile memory cell.

7. The semiconductor component of claim 6, wherein said plurality of test status fields are grouped into sets of test status fields, each set of test status fields for representing the results of each test in a corresponding test flow.

* * * * *